(12) United States Patent
Borade et al.

(10) Patent No.: US 7,592,382 B2
(45) Date of Patent: Sep. 22, 2009

(54) FLAME RETARDANT POLY(ARYLENE ETHER)/POLYAMIDE COMPOSITIONS, METHODS, AND ARTICLES

(75) Inventors: Pravin Kamlakar Borade, Maharashtra (IN); Mark Elkovich, Selkirk, NY (US); Jaykisor Pal, West Bengal (IN)

(73) Assignee: Sabic Innovative Plastics IP B.V. (NL)

( * ) Notice: Subject to any disclaimer, the term of this patent is extended or adjusted under 35 U.S.C. 154(b) by 204 days.

(21) Appl. No.: 11/764,877

(22) Filed: Jun. 19, 2007

(65) Prior Publication Data

US 2007/0244231 A1 Oct. 18, 2007

Related U.S. Application Data

(63) Continuation-in-part of application No. 11/271,278, filed on Nov. 11, 2005, which is a continuation-in-part of application No. 10/994,769, filed on Nov. 22, 2004, now Pat. No. 7,449,507.

(51) Int. Cl.
C08K 5/5313 (2006.01)
(52) U.S. Cl. .................................. 524/133; 524/126
(58) Field of Classification Search ......... 524/462–463, 524/126, 133, 494
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,379,792 A | 4/1968 | Finholt | |
| 4,200,707 A | 4/1980 | Richardson | |
| 4,772,664 A | 9/1988 | Ueda et al. | |
| 4,863,996 A | 9/1989 | Nakazima et al. | |
| 4,970,272 A | 11/1990 | Gallucci | |
| 5,071,894 A | 12/1991 | Weil et al. | |
| 5,132,365 A | 7/1992 | Gallucci | |
| 5,326,805 A | 7/1994 | Sicken et al. | |
| 5,468,530 A | 11/1995 | Gotz et al. | |
| 5,535,600 A | 7/1996 | Mills | |
| 5,543,452 A | 8/1996 | Nakahashi | |
| 5,714,550 A | 2/1998 | Shaw | |
| 5,741,846 A | 4/1998 | Lohmeijer | |
| 5,760,132 A | 6/1998 | McGaughan et al. | |
| 5,843,340 A | 12/1998 | Silvi et al. | |
| 6,111,016 A | 8/2000 | Katayama et al. | |
| 6,166,115 A | 12/2000 | Landa | |
| 6,207,736 B1 | 3/2001 | Nass et al. | |
| 6,242,520 B1 | 6/2001 | Venkataramani et al. | |
| 6,255,371 B1 | 7/2001 | Schlosser | |
| 6,284,830 B1 | 9/2001 | Gottschalk et al. | |
| 6,308,142 B1 | 10/2001 | Choate et al. | |
| 6,344,158 B1 | 2/2002 | Schlosser | |
| 6,365,071 B1 | 4/2002 | Jenewein et al. | |
| 6,384,128 B1 | 5/2002 | Wadahara et al. | |
| 6,414,084 B1 | 7/2002 | Adedeji | |
| 6,423,768 B1 | 7/2002 | Khouri | |
| 6,503,969 B1 | 1/2003 | Klatt et al. | |
| 6,509,401 B1 | 1/2003 | Jenewein et al. | |
| 6,531,530 B2 * | 3/2003 | Asano | 524/414 |
| 6,547,992 B1 | 4/2003 | Schlosser et al. | |
| 6,558,764 B2 | 5/2003 | Blom et al. | |
| 6,569,974 B1 | 5/2003 | Sicken et al. | |
| 6,576,700 B2 | 6/2003 | Patel | |
| 6,583,315 B2 | 6/2003 | Sicken et al. | |
| 6,593,411 B2 | 7/2003 | Koevoets et al. | |
| 6,599,446 B1 * | 7/2003 | Todt et al. | 252/511 |
| 6,600,068 B2 | 7/2003 | Sicken et al. | |
| 6,630,526 B2 | 10/2003 | Heinen et al. | |
| 6,646,030 B2 * | 11/2003 | Heinen et al. | 524/100 |
| 6,727,335 B2 | 4/2004 | Sicken et al. | |
| 6,767,941 B2 | 7/2004 | Van Der Spek et al. | |
| 6,887,930 B2 | 5/2005 | Uchida et al. | |
| 7,056,973 B2 | 6/2006 | Patel | |
| 7,087,666 B2 | 8/2006 | Hoerold et al. | |
| 7,119,136 B2 | 10/2006 | Campbell et al. | |
| 7,205,346 B2 | 4/2007 | Harashina | |
| 2001/0007888 A1 | 7/2001 | Asano | |
| 2003/0166762 A1 | 9/2003 | Koevoets et al. | |
| 2005/0250885 A1 * | 11/2005 | Mercx et al. | 524/99 |
| 2006/0058432 A1 | 3/2006 | Perego et al. | |

(Continued)

FOREIGN PATENT DOCUMENTS

EP 0183195 A2 6/1986

(Continued)

OTHER PUBLICATIONS

WO 2007/055147; May 18, 2007; Human Translation; 43 pages.

(Continued)

Primary Examiner—Peter Szekely
(74) Attorney, Agent, or Firm—Cantor Colburn LLP

(57) ABSTRACT

A flame retardant poly(arylene ether)/polyamide composition includes a poly(arylene ether), a polyamide, about 5 to about 15 weight percent glass fiber, and a flame retardant consisting of a metal dialkyl phosphinate. Methods of preparing the composition are described, as are articles that include it.

37 Claims, No Drawings

U.S. PATENT DOCUMENTS

| | | | |
|---|---|---|---|
| 2006/0111484 | A1 | 5/2006 | Fishburn |
| 2006/0111548 | A1 | 5/2006 | Elkovitch et al. |
| 2006/0111549 | A1 | 5/2006 | Elkovitch et al. |
| 2006/0167143 | A1 | 7/2006 | Borade et al. |
| 2006/0167144 | A1 | 7/2006 | Borade et al. |
| 2006/1671434 | | 7/2006 | Borade |
| 2007/0040154 | A1 | 2/2007 | Murakami |

FOREIGN PATENT DOCUMENTS

| | | | |
|---|---|---|---|
| EP | 0501175 | A1 | 9/1992 |
| EP | 0528604 | A1 | 2/1993 |
| EP | 0657498 | | 6/1995 |
| EP | 1522551 | | 4/2005 |
| WO | 9957187 | | 11/1999 |
| WO | 0228953 | | 4/2002 |
| WO | 2006055732 | A2 | 5/2006 |

OTHER PUBLICATIONS

W02007/058169; May 24, 2007; Human Translation; 58 pages.
WO 2007/058170; May 24, 2007; Human Translation; 54 pages.
JP2000-212434; Aug. 2, 2000; Translation.
JP2005-364323; Jul. 5, 2007; Abstract Only (1 page).
JP2006-308442; Jul. 19, 2007; Abstract Only (1 page).
JP2006-308441; Jul. 19, 2007; Abstract Only (1 page).
EP0699708; Mar. 6, 1996; Translation.
EP0332965; Mar. 6,1989; Translation.
EP0183195; Nov. 21, 1985; Translation.
International Search Report; International Application No. PCT/NL01/00733; Date of Mailing of International Search Report Jan. 30, 2002 (2 pages).
International Search Report; International Application No. PCT/US2007/006949; Date of Mailing of International Search Report Aug. 22, 2007 (3 pages).
S. Horold et al., "A New Generation of Flame Retarded Polyamides Based on Phosphinates", 7 pages http://ec.europa.eu/environment/waste/stakeholders/individual_bus/clariant/att_2.pdf , printed Feb. 6, 2007.
U.S. Appl. No. 11/278,720, filed Apr. 5, 2006, available in USPTO Image File Wrapper.
UL 94 "Tests for Flammability of Plastic Materials for Parts in Devices and Appliances" 52 pages, Unknown.
ASTM D 256-06a "Standard Test Methods for Determining the Izod Pendulum Impact Resistance of Plastics 1", 20 pages, Unknown.
ASTM D 638-03 "Standard Test Methods for Tensile Properties of Plastics 1", 15 pages, Unknown.

* cited by examiner

US 7,592,382 B2

FLAME RETARDANT POLY(ARYLENE ETHER)/POLYAMIDE COMPOSITIONS, METHODS, AND ARTICLES

CROSS REFERENCE TO RELATED APPLICATIONS

This application is a continuation-in-part of U.S. patent application Ser. No. 11/271,278, filed Nov. 11, 2005, which is a continuation-in-part of U.S. patent application Ser. No. 10/994,769, filed on Nov. 22, 2004 now U.S. Pat. No. 7,449,507. These related applications are incorporated by reference herein in their entirety.

BACKGROUND OF THE INVENTION

Poly(arylene ether) resins have been blended with polyamide resins to provide compositions having a wide variety of beneficial properties such as heat resistance, chemical resistance, impact strength, hydrolytic stability, and dimensional stability.

In some applications it is desirable to use poly(arylene ether)/polyamide blends with good flame resistance. Unfortunately, this flame resistance is difficult to achieve for articles with lower thicknesses while maintaining or improving mechanical properties. Conventional flame retardant poly(arylene ether)/polyamide blends often use silicone fluid and boron phosphate to achieve good flame resistance ratings, however the use of these flame retardants is associated with a loss of mechanical strength. Moreover, it is particularly difficult to achieve flame retardancy in glass fiber reinforced thermoplastic compositions, because the presence of the reinforcing filler alters the combustion behavior of the composition compared to non-reinforced compositions. There therefore remains a need for glass fiber reinforced poly(arylene ether)/polyamide compositions that exhibit good flame retardancy without compromising mechanical strength.

BRIEF DESCRIPTION OF THE INVENTION

The above-described and other drawbacks are alleviated by a composition comprising: a poly(arylene ether); a polyamide; about 5 to about 15 weight percent glass fiber; and a flame retardant consisting of a metal diallyl phosphinate; wherein the composition comprises 0 to about 5 weight percent of a copolymer of acrylonitrile and an alkenyl aromatic monomer; wherein all weight percents are based on the total weight of the composition; and wherein the composition has a flammability rating of V-0 or V-1 measured according to the UL 94 Vertical Burning Test at a thickness of 3 millimeters, and a notched Izod impact strength of at least 40 Joules/meter measured at 23° C. according to ASTM D256, Method A.

Another embodiment is a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 3 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 1.6 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is a composition consisting of: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); and optionally, up to 5 weight percent of an additive selected from the group consisting of stabilizers, mold release agents, processing aids, drip retardants, nucleating agents, dyes, pigments, antioxidants, antistatic agents, blowing agents, metal deactivators, antiblocking agents, fragrances, and combinations thereof; wherein the composition is free of impact modifier; wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is a method of preparing a thermoplastic composition, comprising: melt kneading a poly(arylene ether), a polyamide, about 5 to about 15 weight percent glass fiber, 0 to about 5 weight percent of a copolymer of acrylonitrile and an alkenyl aromatic monomer, and a flame retardant consisting of a metal diallcyl phosphinate to form a thermoplastic composition; wherein all weight percents are based on the total weight of the composition; and wherein the composition has a flammability rating of V-0 or V-1 measured according to the UL 94 Vertical Burning Test at a thickness of 3 millimeters, and a notched Izod impact strength of at least 40 Joules/meter measured at 23° C. according to ASTM D256, Method A.

Another embodiment is a method of preparing a thermoplastic composition, comprising: melt kneading about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units, about 40 to about 50 weight percent of a polyamide comprising nylon-6 and nylon-6,6, about 0.5 to about 2 weight percent citric acid, about 8 to about 12 weight percent glass fiber, and about 9 to about 15 weight percent of a flame retardant consisting of aluminum tris(diethyl phosphinate) to form a thermoplastic composition; wherein the thermoplastic composition is free of impact modifier; wherein all weight percents are based on the total weight of the thermoplastic composition; and wherein the thermoplastic composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is an article comprising a composition comprising: a poly(arylene ether); a polyamide; about 5 to about 15 weight percent glass fiber; and a flame retardant consisting of a metal dialkyl phosphinate; wherein the composition comprises 0 to about 5 weight percent of a copolymer of acrylonitrile and an alkenyl aromatic monomer; wherein all weight percents are based on the total weight of the composition; and wherein the composition has a flammability rating of V-0 or V-1 measured according to the UL 94 Vertical Burning Test at a thickness of 3 millimeters, and a notched Izod impact strength of at least 40 Joules/meter measured at 23° C. according to ASTM D256, Method A.

Another embodiment is an article comprising a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 3 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is an article comprising a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is an article comprising a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier; wherein all weight percents are based on the total weight of the composition; and wherein the composition exhibits a flammability rating of V-0 measured according to the UL 94 Vertical Burning Test at a thickness of 1.6 millimeters, a notched Izod impact strength of at least 50 Joules/meter measured at 23° C. according to ASTM D256, Method A, and a tensile elongation at break of at least 3 percent, measured at 23° C. according to ASTM D638.

Another embodiment is an article comprising a composition consisting of: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); and optionally, up to 5 weight percent of an additive selected from the group consisting of stabilizers, mold release agents, processing aids, drip retardants, nucleating agents, dyes, pigments, antioxidants, anti-static agents, blowing agents, metal deactivators, antiblocking agents, fragrances, and combinations thereof; wherein the composition is free of impact modifier; wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638.

These and other embodiments, including compositions prepared by the above-mentioned methods and articles comprising them, are described in detail below.

DETAILED DESCRIPTION OF THE INVENTION

One embodiment is a flame retardant composition comprising: a poly(arylene ether); a polyamide; about 5 to about 15 weight percent glass fiber; and a flame retardant consisting of a metal dialkyl phosphinate; wherein the composition comprises 0 to about 5 weight percent of a copolymer of acrylonitrile and an alkenyl aromatic monomer; wherein all weight percents are based on the total weight of the composition; and wherein the composition has a flammability rating of V-0 or V-1 measured according to the UL 94 Vertical Burning Test at a thickness of 3 millimeters, and a notched Izod impact strength of at least 40 Joules/meter measured at 23° C. according to ASTM D256, Method A. The composition exhibits excellent flame retardancy, as determined, for example, according to Underwriter's Laboratory Bulletin 94, "Tests for Flammability of Plastic Materials, UL 94". For example, the composition has a flammability rating of V-1, more specifically V-0, measured according to the UL 94 Vertical Burning Test at a thickness of 3 millimeters. Surprisingly, the flame retardancy can be maintained at even lower thicknesses. For example, in some embodiments, the composition has a flammability rating of V-0 measured according to the UL 94 Vertical Burning Test at a thickness of 2 millimeters.

The composition exhibits this excellent flame retardancy while maintaining good physical properties. For example, the composition has a notched Izod impact strength of at least 40 Joules/meter, specifically at least 50 Joules/meter, more specifically 40 to about 65 Joules/meter, even more specifically about 50 to about 65 Joules/meter, yet more specifically about 50 to about 60 Joules/meter, all as measured at 23° C. according to ASTM D256, Method A. As another example, in some embodiments the composition has a tensile elongation at break of at least 3 percent, specifically 3 to about 6 percent, as measured at 23° C. according to ASTM D638. It was unexpected that such a high degree of flame retardancy could be achieved with a single metal dialkyl phosphinate flame retardant, and without compromising physical properties.

The flame retardant composition comprises a poly(arylene ether). As used herein, the term "poly(arylene ether)" refers to a polymer comprising a plurality of repeating arylene ether units. In some embodiments, the poly(arylene ether) comprises repeating structural units having the formula

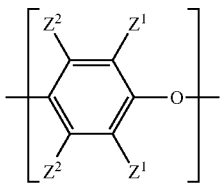

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. However, when the hydrocarbyl residue is described as "substituted", may contain heteroatoms over and above the carbon and hydrogen members of the substituent residue. Thus, when specifically described as substituted, the hydrocarbyl residue may also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it may contain heteroatoms within the backbone of the hydrocarbyl residue. In some embodiments, each $Q^1$ is independently alkyl or phenyl, for example, $C_1$-$C_4$ alkyl and specifically methyl, and each $Q^2$ is independently hydrogen or methyl. The poly(arylene ether) may comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present.

The poly(arylene ether) may be in the form of a homopolymer; a copolymer; a graft copolymer; an ionomer; a block copolymer, for example comprising arylene ether units and blocks derived from alkenyl aromatic compounds; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and/or a weight average molecular weight of about 5,000 to about 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) can have an initial intrinsic viscosity of 0.10 to 0.60 deciliters per gram (dl/g), or, more specifically, 0.29 to 0.48 dl/g, as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated as 100×(final intrinsic viscosity—initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

In one embodiment the poly(arylene ether) has a glass transition temperature ($T_g$) of 160 to 250° C., specifically 180 to 240° C., more specifically 200 to 230° C., all as determined by differential scanning calorimetry (DSC) at 20° C./minute ramp.

The composition comprises poly(arylene ether) in an amount of about 15 to about 65 weight percent, specifically about 20 to about 60 weight percent, more specifically about 25 to about 50 weight percent, even more specifically about 25 to about 40 weight percent, all based on the total weight of the composition.

In addition to the poly(arylene ether), the flame retardant composition comprises a polyamide. Polyamide resins, also known as nylons, are characterized by the presence of an amide group (—C(O)NH—), and are described in U.S. Pat. No. 4,970,272 to Gallucci. Suitable polyamide resins include nylon-6, nylon-6,6, nylon-4, nylon-4,6, nylon-12, nylon-6,10, nylon 6,9, nylon-6,12, amorphous polyamide resins, nylon 6/6T and nylon 6,6/6T with triamine contents below 0.5 weight percent, nylon 9T, and combinations of two or more of the foregoing polyamides. In some embodiments, the polyamide resin comprises nylon-6 and nylon-6,6. In some embodiments, the polyamide resin or combination of polyamide resins has a melting point ($T_m$) greater than or equal to 171° C. When the polyamide comprises a super tough polyamide, that is, a rubber-toughened polyamide, the composition may or may not contain a separate impact modifier.

Polyamide resins may be obtained by a number of well known processes such as those described in U.S. Pat. Nos. 2,071,250, 2,071,251, 2,130,523, and 2,130,948 to Carothers; U.S. Pat. Nos. 2,241,322 and 2,312,966 to Hanford; and U.S. Pat. No. 2,512,606 to Bolton et al. Polyamide resins are commercially available from a variety of sources.

Polyamide resins having an intrinsic viscosity of up to 400 milliliters per gram (mL/g) can be used, or, more specifically, having a viscosity of 90 to 350 mL/g, or, even more specifically, having a viscosity of 110 to 240 mL/g, as measured in a 0.5 weight percent (wt %) solution in 96 wt % sulfuric acid in accordance with ISO 307.

The polyamide may have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In one embodiment, the polyamide resin comprises a polyamide having an amine end group concentration greater than or equal to 35 microequivalents amine end group per gram of polyamide (μeq/g) as determined by titration with HCl. The amine end group concentration may be greater than or equal to 40 μeq/g, or, more specifically, greater than or equal to 45 μeq/g. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution, and the weight of the polyamide sample.

The composition comprises polyamide in an amount of about 30 to about 85 weight percent, specifically about 33 to about 60 weight percent, more specifically about 38 to about 55 weight percent, even more specifically about 40 to about 50 weight percent, all based on the total weight of the composition.

When used herein, the expression "compatibilizing agent" refers to a polyfunctional compound that interacts with the poly(arylene ether), the polyamide resin, or both. This interaction may be chemical (for example, grafting) and/or physical (for example, affecting the surface characteristics of the dispersed phases). In either instance the resulting compatibilized poly(arylene ether)/polyamide composition exhibits improved compatibility, particularly as evidenced by enhanced impact strength, mold knit line strength, and/or tensile elongation. As used herein, the expression "compatibilized poly(arylene ether)/polyamide blend" refers to poly (arylene ether)/polyamide compositions that have been physically and/or chemically compatibilized with an agent as discussed above, as well as poly(arylene ether)/polyamide compositions that are physically compatible without such agents, as taught, for example, in U.S. Pat. No. 3,379,792 to Finholt.

Examples of compatibilizing agents that may be employed include liquid diene polymers, epoxy compounds, oxidized polyolefin wax, quinones, organosilane compounds, polyfunctional compounds, functionalized poly(arylene ether), and combinations comprising at least one of the foregoing. Compatibilizing agents are further described in U.S. Pat. No. 5,132,365 to Gallucci and U.S. Pat. No. 6,593,411 to Koevoets et al., as well as U.S. Patent Application Publication No. US 2003/0166762 A1 of Koevoets et al.

In some embodiments, the compatibilizing agent comprises a polyfunctional compound. Polyfunctional compounds that may be employed as a compatibilizing agent are typically of three types. The first type of polyfunctional compound has in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, t-ethylacrylic acid, pentenoic acid; decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer less than or equal to 30); unsaturated amines resulting from replacing from replacing the —OH group(s) of the above unsaturated alcohols with —NH$_2$ group(s); functionalized diene polymers and copolymers; and combinations comprising one or more of the foregoing. In one embodiment, the compatibilizing agent comprises maleic anhydride and/or fumaric acid.

The second type of polyfunctional compatibilizing agent has both (a) a group represented by the formula (OR) wherein R is hydrogen or an allcyl, aryl, acyl or carbonyl dioxy group and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters, and acid amides represented by the formula:

wherein R is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an allcyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, R$^I$, R$^{II}$, R$^{III}$, and R$^{IV}$ cannot be aryl when the respective substituent has less than 6 carbon atoms.

Suitable polycarboxylic acids include, for example, citric acid, malic acid, and agaricic acid, including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, monostearyl and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Examples of suitable salts include calcium malate, calcium citrate, potassium malate, and potassium citrate.

The third type of polyfunctional compatibilizing agent has in the molecule both (a) an acid halide group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloroformyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

Some polyamides require particular types of compatibilizing agents. For example, monomeric compatibilizing agents or monomeric compatibilizing agents reacted with poly (arylene ether) are useful with nylon 9T but polymeric compatibilizing agents are generally unsuccessful.

The foregoing compatibilizing agents may be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalized the poly(arylene ether). For example, the poly(arylene ether) may be pre-reacted with maleic anhydride to form an anhydride-functionalized polyphenylene ether that has improved compatibility with the polyamide compared to a non-functionalized polyphenylene ether.

Where the compatibilizing agent is employed in the preparation of the compositions, the amount used will be dependent upon the specific compatibilizing agent chosen and the specific polymeric system to which it is added. In some embodiments, the compatibilizing agent is citric acid. The citric acid may be used in an amount of about 0.5 to about 2 weight percent, based on the total weight of the composition.

In addition to the poly(arylene ether) and the polyamide, the flame retardant composition comprises about 5 to about 15 weight percent glass fiber, based on the total weight of the composition. In some embodiments, the glass fiber amount is about 8 to about 12 weight percent. Suitable glass fibers include those based on E, A, C, ECR, R, S, D, and NE glasses, as well as quartz. The glass fiber may have a diameter of about 2 to about 30 micrometers, specifically about 5 to about 25 micrometers, more specifically about 10 to about 15 micrometers. The length of the glass fibers before compounding can be about 0.3 to about 2 centimeters, specifically about 0.5 to about 1.5 centimeters. The glass fiber can, optionally, include a so-called adhesion promoter to improve its compatibility with the thermoplastic composition. Adhesion promoters include chromium complexes, silanes, titanates, zircoaluminates, propylene maleic anhydride copolymers, reactive cellulose esters and the like. Suitable glass fiber is commercially available from suppliers including, for example, Owens Corning, Johns Manville, and PPG Industries.

In addition to the poly(arylene ether), the polyamide, and the glass fiber, the composition comprises a flame retardant consisting of a metal dialkyl phosphinate. As used herein, the term "metal dialkyl phosphinate" refers to a salt comprising at least one metal cation and at least one diallcyl phosphinate anion. In some embodiments, the metal dialkyl phosphinate has the formula

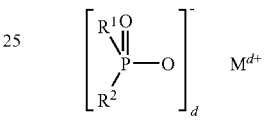

wherein R$^1$ and R$^2$ are each independently C$_1$-C$_6$ alkyl; M is calcium, magnesium, aluminum, or zinc; and d is 2 or 3. Examples of R$^1$ and R$^2$ include methyl, ethyl, n-propyl, isopropyl, n-butyl, tert-butyl, n-pentyl, and phenyl. In some embodiments, R$^1$ and R$^2$ are ethyl, M is aluminum, and d is 3 (that is, the metal diallcyl phosphinate is aluminum tris(diethyl phosphinate)).

In some embodiments, the metal dialkyl phosphinate is in particulate form. The metal diallcyl phosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkyl phosphinate may be combined with a polymer, such as a poly(arylene ether), a polyolefin, a polyamide, an impact modifier or combination thereof, to form a masterbatch. The metal dialkyl phosphinate masterbatch comprises the metal dialkyl phosphinate in an amount greater than is present in the thermoplastic composition. Employing a masterbatch for the addition of the metal diallcyl phosphinate to the other components of the composition can facilitate addition and improve distribution of the metal dialkyl phosphinate.

The composition typically comprises an amount of metal diallcyl phosphinate sufficient to achieve a flammability rating of V-1 or better, measured according to UL 94 at a thickness of 3.0 millimeters. In some embodiments, the composition comprises an amount of metal dialkyl phosphinate sufficient to achieve a flammability rating of V-0 at a thickness of 2.0 millimeters. For example, the composition may comprise a metal diallcyl phosphinate in an amount of about 5 to about 25 weight percent, specifically about 7 to about 20 weight percent, more specifically about 8 to about 15 weight percent, even more specifically about 10 to about 14 weight percent, all based on the total weight of the composition.

As demonstrated in the working examples below, there is a complex and unpredictable interaction between the glass fiber amount and the composition of the flame retardant. For example, good flame retardancy can be achieved using the combination of a glass fiber amount of about 10 weight percent and a metal diallcyl phosphinate as the sole flame retardant. When the glass fiber amount is held constant at 10 weight percent and a combination of metal diallcyl phosphinate and zinc borate is used as the flame retardant, the flame retardancy is decreased relative to that obtained with metal diallcyl phosphinate alone. In contrast, at higher glass fiber amounts, different flame retardant compositions are superior to metal diallcyl phosphinate alone. Given this complex and unpredictable interaction of glass fiber amount and flame retardant composition, prior to the work of the present inventors, there was no reasonable expectation of success for with the combination of about 5 to about 15 weight percent glass fiber and a flame retardant consisting of a metal diallcyl phosphinate.

The composition comprises 0 to about 5 weight percent of a copolymer of acrylonitrile and an alkenyl aromatic monomer. The range of 0 to about 5 weight percent means that this component may be present or absent, but if it is present it is used in an amount of no more than 5 weight percent, based on the total weight of the composition. As used herein, the term "copolymer of acrylonitrile and an alkenyl aromatic monomer" refers to a copolymer prepared by the polymerization of monomers comprising acrylonitrile and an alkenyl aromatic monomer (for example, styrene). Included among copolymers of acrylonitrile and an alkenyl aromatic monomer are the components of US2001/0007888 A1 of Asano et al. described as "a rubber-containing copolymer of a vinyl cyanide and an aromatic vinyl (A-2)" and "a copolymer of a vinyl cyanide and an aromatic vinyl (A-3)". By limiting the amount of any copolymer of acrylonitrile and an alkenyl aromatic monomer to no more than 5 weight percent of the total composition, the present composition is distinguished from the composition of Asano et al., which comprises 100 parts by weight or less of a filler and 100 parts by weight of a thermoplastic resin that comprises 17 to 85% by weight of at least one of a rubber-containing copolymer of a vinyl cyanide and an aromatic vinyl (A-2) and a copolymer of a vinyl cyanide and an aromatic vinyl (A-3). In some embodiments, the present composition excludes any copolymer of acrylonitrile and an alkenyl aromatic monomer.

In some embodiments, the composition comprises an impact modifier. As used herein, an "impact modifier" refers to an elastomeric polymer or copolymer having a glass transition temperature less than or equal to 0° C., specifically less than or equal to −20° C. One type of impact modifier is a rubber-containing copolymer of acrylonitrile and an alkenyl aromatic monomer. Another type of impact modifier is a block copolymer of alkenyl aromatic compound and a conjugated diene. Such block copolymers include A-B diblock copolymers and A-B-A triblock copolymers having of one or two poly(alkenyl aromatic) blocks, A, which are typically polystyrene blocks, and a poly(conjugated diene) rubber block, B, which is typically a polyisoprene or polybutadiene block. The polyisoprene or polybutadiene block may be partially or completely hydrogenated. Mixtures of these diblock and triblock copolymers may also be used as well as mixtures of non-hydrogenated copolymers, partially hydrogenated copolymers, fully hydrogenated copolymers, radial teleblock copolymers, tapered block copolymers, and combinations of two or more of the foregoing.

Suitable A-B and A-B-A block copolymers include, for example, polystyrene-polybutadiene (SB), polystyrene-poly (ethylene-butylene) (SEB), polystyrene-poly(ethylene-butylene)-polystyrene (SEBS), polystyrene-poly(ethylene-propylene) (SEP), polystyrene-polyisoprene (SI), poly(alpha-methylstyrene)-polybutadiene, polystyrene-polybutadiene-polystyrene (SBS), polystyrene-poly(ethylene-propylene)-polystyrene (SEPS), polystyrene-polyisoprene-polystyrene (SIS), poly(alpha-methylstyrene)-polybutadiene-poly(alpha-methylstyrene), polystyrene-poly(ethylene-propylene-styrene)-polystyrene, and the like, and mixtures thereof. Such A-B and A-B-A block copolymers are available commercially from a number of sources, including Phillips Petroleum under the trademark SOLPRENE, Kraton Polymers under the trademark KRATON, Dexco under the trademark VECTOR, Asahi Kasai under the trademark TUFTEC, Total Petrochemicals under the trademarks FINAPRENE and FINACLEAR, Kuraray under the trademark SEPTON, and Chevron Phillips Chemical Company under the tradename K-RESIN.

In one embodiment, the impact modifier comprises polystyrene-poly(ethylene-butylene)-polystyrene, polystyrene-poly(ethylene-propylene), or a mixture thereof.

Another type of impact modifier is essentially free of alkenyl aromatic repeating units and comprises one or more moieties selected from the group consisting of carboxylic acid, anhydride, epoxy, oxazoline, and orthoester. Essentially free is defined as having alkenyl aromatic units present in an amount less than 5 weight percent, more specifically less than 3 weight percent, even more specifically less than 2 weight percent, based on the total weight of the block copolymer. When the impact modifier comprises a carboxylic acid moiety, the carboxylic acid moiety may be neutralized with an ion, preferably a metal ion such as zinc or sodium.

The impact modifier may be an alkylene-alkyl (meth)acrylate copolymer wherein the alkylene groups may have 2 to 6 carbon atoms, and the allcyl group of the allyl (meth)acrylate may have 1 to 8 carbon atoms. This type of polymer can be prepared by copolymerizing an olefin, for example, ethylene and/or propylene, with various (meth)acrylate monomers and/or various maleic-based monomers. The fragment "(meth)acryl-" as used herein includes acryl- and methacryl-. Included within the term (meth)acrylate monomers are alkyl (meth)acrylate monomers as well as various (meth)acrylate monomers containing at least one of the aforementioned reactive moieties. In one embodiment, the copolymer is derived from ethylene, propylene, or mixtures of ethylene and propylene, as the alkylene component; butyl acrylate, hexyl acrylate, or propyl acrylate as well as the corresponding allcyl (methyl)acrylates, for the allcyl (meth)acrylate monomer component, with acrylic acid, maleic anhydride, glycidyl methacrylate or a combination thereof as monomers providing the additional reactive moieties (that is, carboxylic acid, anhydride, epoxy). Suitable impact modifiers of this type are commercially available from a variety of sources including those sold by DuPont under the tradenames ELVALOY PTW, SURLYN, and FUSABOND.

The aforementioned impact modifiers can be used singly or in combination.

The composition may optionally further comprise a rubber-modified poly(alkenyl aromatic) resin. For the purposes of this application, a rubber-modified poly(alkenyl aromatic) resin is distinct from an impact modifier. A rubber-modified poly(alkenyl aromatic) resin comprises a polymer derived from at least one of the alkenyl aromatic monomers described above, and further comprises a rubber modifier in the form of a blend and/or a graft. The rubber modifier may be a polymerization product of at least one $C_4$-$C_{10}$ nonaromatic diene monomer, such as butadiene or isoprene. The rubber-modified poly(alkenyl aromatic) resin comprises about 98 to about 70 weight percent of the poly(alkenyl aromatic) resin and about 2 to about 30 weight percent of the rubber modifier, preferably about 88 to about 94 weight percent of the poly (alkenyl aromatic) resin and about 6 to about 12 weight percent of the rubber modifier. Exemplary rubber-modified poly (alkenyl aromatic) resins include the styrene-butadiene copolymers containing about 88 to about 94 weight percent styrene and about 6 to about 12 weight percent butadiene. These styrene-butadiene copolymers, also known as high-impact polystyrenes, are commercially available as, for example, GEH 1897 from General Electric Company, and BA 5350 from Chevron Chemical Company.

The composition may comprise the rubber-modified poly (alkenyl aromatic) resin in an amount up to 25 weight percent, more specifically up to 20 weight percent, even more specifically up to 18 weight percent, based on the total weight of the composition.

In some embodiments, the composition excludes any reinforcing filler other than the glass fiber. Alternatively, in some embodiments the composition comprises a reinforcing in addition to the glass fiber. Reinforcing fillers are fillers that can improve dimensional stability by lowering the composition's coefficient of thermal expansion. They also increase the flexural and tensile modulus, reduce warpage, or a combination thereof, when compared to an analogous composition free of additional reinforcing filler.

Non-limiting examples of reinforcing fillers include silica powder, such as fused silica and crystalline silica; boron-nitride powder and boron-silicate powders; alumina, and magnesium oxide (or magnesia); wollastonite including surface-treated wollastonite; calcium sulfate (as its anhydride, dihydrate or trihydrate); calcium carbonate including chalk, limestone, marble and synthetic, precipitated calcium carbonates, generally in the form of a ground particulates; talc, including fibrous, modular, needle shaped, and lamellar talc; glass spheres, both hollow and solid; kaolin, including hard, soft, calcined kaolin, and kaolin comprising various coatings known in the art to facilitate compatibility with the polymeric matrix resin; mica; feldspar; silicate spheres; flue dust; cenospheres; finite; aluminosilicate (armospheres); natural silica sand; quartz; quartzite; perlite; tripoli; diatomaceous earth; synthetic silica; and combinations thereof. All of the above fillers may be surface treated with silanes to improve adhesion and dispersion with the polymeric matrix resin.

Additional exemplary reinforcing fillers include flaked fillers that offer reinforcement such as glass flakes, flaked silicon carbide, aluminum diboride, aluminum flakes, and steel flakes. Exemplary reinforcing fillers also include fibrous fillers such as short inorganic fibers, natural fibrous fillers, single crystal fibers, glass fibers, and organic reinforcing fibrous fillers. Short inorganic fibers include those derived from blends comprising at least one of aluminum silicates, aluminum oxides, magnesium oxides, and calcium sulfate hemihydrate. Natural fibrous fillers include wood flour obtained by pulverizing wood, and fibrous products such as cellulose, cotton, sisal, jute, starch, cork flour, lignin, ground nut shells, corn, rice grain husks. Single crystal fibers or "whiskers" include silicon carbide, alumina, boron carbide, iron, nickel, and copper single crystal fibers. In addition, organic reinforcing fibrous fillers may also be used including organic polymers capable of forming fibers. Illustrative examples of such organic fibrous fillers include, for example, poly(ether ketone), polyimide, polybenzoxazole, poly(phenylene sulfide), polyesters, polyethylene, aromatic polyamides, aromatic polyimides or polyetherimides, polytetrafluoroethylene, acrylic resins, and poly(vinyl alcohol). Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture.

In some embodiments, the composition excludes electrically conductive fillers. Alternatively, in some embodiments, the composition comprises an electrically conductive filler, such as, for example, electrically conductive carbon black, carbon nanotubes, carbon fibers, or a combination of two or ore of the foregoing. When an electrically conductive filler is present, it is used in an amount sufficient to achieve a specific volume resistivity less than or equal to $10^6$ ohm-centimeters. For example, the composition may comprise electrically conductive carbon black and/or carbon fibers and/or carbon nanotubes in an amount of 1 to 20 weight percent, specifically 1.2 to 15 weight percent, more specifically 1.4 to 10 weight percent, even more specifically 1.6 to 5 weight percent, all based on the total weight of the composition.

The composition can, optionally, further comprise one or more other additives known in the thermoplastics arts. Useful additives include, for example, stabilizers, mold release agents, processing aids, drip retardants, nucleating agents, dyes, pigments, antioxidants, anti-static agents, blowing agents, metal deactivators, antiblocking agents, nanoclays, fragrances (including fragrance-encapsulated polymers), and the like, and combinations thereof. Additives can be added in amounts that do not unacceptably detract from the desired performance and physical properties of the composition. Such amounts can be determined by a skilled artisan without undue experimentation. Generally, the total amount of additives will be less than or equal to 5 weight percent.

The composition can, optionally, exclude any polymer other than those taught herein as required or optional.

In some embodiments, the composition comprises about 15 to about 65 weight percent of the poly(arylene ether), about 30 to about 85 weight percent of the polyamide, and about 5 to about 25 weight percent of the flame retardant. In some embodiments, the composition comprises about 25 to about 40 weight percent of the poly(arylene ether), about 40 to about 50 weight percent of the polyamide, about 9 to about 15 weight percent of the flame retardant, and about 8 to about 12 weight percent of the glass fibers.

One embodiment is a composition comprising: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); wherein the composition is free of impact modifier (including any impact modifier that is a rubber-containing copolymer of a acrylonitrile and an alkenyl aromatic monomer); wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638. In some embodiments, the composition exhibits a notched Izod impact strength of 50 to 65 Joules/meter measured at 23° C. according to ASTM D256, Method A, and a tensile elongation at break of 3 to 10 percent, measured at 23° C. according to ASTM D638.

Another embodiment is a composition consisting of: about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units; about 40 to about 50 weight percent of a polyamide comprising nylon-6 and nylon-6,6; about 0.5 to about 2 weight percent citric acid; about 8 to about 12 weight percent glass fiber; and about 9 to about 15 weight percent of a flame retardant consisting of aluminum tris(diethyl phosphinate); and optionally, up to 5 weight percent of an additive selected from the group consisting of stabilizers, mold release agents, processing aids, drip retardants, nucleating agents, dyes, pigments, antioxidants, antistatic agents, blowing agents, metal deactivators, antiblocking agents, fragrances, and combinations thereof; wherein the composition is free of impact modifier; wherein all weight percents are based on the total weight of the composition; and wherein the composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638. In some embodiments, the composition exhibits a notched Izod impact strength of 50 to 65 Joules/meter measured at 23° C. according to ASTM D256, Method A, and a tensile elongation at break of 3 to 10 percent, measured at 23° C. according to ASTM D638.

The composition can be prepared by melt kneading or a combination of dry blending and melt kneading. Melt kneading can be performed in a single-screw or twin-screw extruder or similar mixing device that can apply a shear to the components. Thus, one embodiment is a method of preparing a thermoplastic composition, comprising: melt kneading a poly (arylene ether), a polyamide, about 5 to about 15 weight percent glass fiber, 0 to about 5 weight percent of a copolymer of acrylonitrile and an alkenyl aromatic monomer, and a flame retardant consisting of a (single) metal dialkyl phosphinate to form a thermoplastic composition; wherein all weight percents are based on the total weight of the composition. When preparing the composition, the flame retardant and a portion of the polyamide can, optionally, be provided in the form of a masterbatch comprising about 30 to about 50 weight percent flame retardant and about 50 to about 70 weight percent polyamide, based on the weight of the masterbatch.

Another embodiment is a method of preparing a thermoplastic composition, comprising: melt kneading about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units, about 40 to about 50 weight percent of a polyamide comprising nylon-6 and nylon-6,6, about 0.5 to about 2 weight percent citric acid, about 8 to about 12 weight percent glass fiber, and about 9 to about 15 weight percent of a flame retardant consisting of aluminum tris(diethyl phosphinate) to form a thermoplastic composition; wherein the thermoplastic composition is free of impact modifier; wherein all weight percents are based on the total weight of the thermoplastic composition; and wherein the thermoplastic composition exhibits a flammability rating of V-0 measured according to the UL 94 Vertical Burning Test at a thickness of 2 millimeters, a notched Izod impact strength of at least 50 Joules/meter measured at 23° C. according to ASTM D256, Method A, and a tensile elongation at break of at least 3 percent, measured at 23° C. according to ASTM D638. In some embodiments, the composition exhibits a notched Izod impact strength of 50 to 65 Joules/meter measured at 23° C. according to ASTM D256, Method A, and a tensile elongation at break of 3 to 10 percent, specifically 3 to 6 percent, measured at 23° C. according to ASTM D638. When preparing the composition, the flame retardant and a portion of the polyamide can, optionally, be provided in the form of a masterbatch comprising about 30 to about 50 weight percent flame retardant and about 50 to about 70 weight percent polyamide, based on the weight of the masterbatch.

The glass fiber can be added with the polyamide (with the second portion when two portions are employed), or after the addition of the polyamide (after the second portion when two portions are employed). The glass fiber may be part of the flame retardant masterbatch.

Other embodiments include compositions prepared by any of the above-described methods.

One embodiment is an article comprising any of the above-described compositions. The composition is particularly suitable for preparing article by injection molding, but other thermoplastic processing methods may be used. Useful articles that can be prepared from the composition include electrical and automotive connectors, electrical devices such as switches, and electrical enclosures such as junction boxes, lighting enclosures, and sockets.

The invention is further illustrated by the following non-limiting examples.

EXAMPLES 1-3, COMPARATIVE EXAMPLES 1-7

Ten compositions were prepared using the components described in Table 1. Comparative Example 1 contains no flame retardant. Comparative Example 2 contains a flame retardant mixture of boron phosphate and silicone fluid. Examples 1, 2, and 3 all contain a metal dialkyl phosphinate as the sole flame retardant. In Example 3, the metal diallcyl phosphinate is added in the form of a polyamide masterbatch. Comparative Examples 3 and 4 contain a flame retardant mixture of a metal dialkyl phosphinate and zinc borate. Comparative Example 5 contains zinc borate as the sole flame retardant. Comparative Examples 6 contains a metal dialkyl phosphinate as the sole flame retardant and Comparative Example 7 contains a flame retardant mixture of a metal dialkyl phosphinate and zinc borate, but Comparative Examples 6 and 7 both lack glass fibers.

TABLE 1

| Component | Description, Product Name, Supplier |
|---|---|
| PPE | A poly(2,6-dimethylphenylene ether) with an intrinsic viscosity of 0.41 dL/g as measured in chloroform at 25° C. commercially available from GE Plastics |
| Citric Acid | Citric acid having a minimum purity of 99 percent, obtained from Intercontinental Chemicals |
| SEBS | A polystyrene-poly(ethylene-butylene)-polystyrene triblock copolymer having 33 percent polystyrene, obtained as Kraton G1651 from Kraton Polymers |
| Irganox 1076 | A hindered phenolic antioxidant, octadecyl 3-(3',5'-di-tert-butyl-4'-hydroxyphenyl)propionate, CAS Reg. No. 2082-79-3, obtained from Ciba Specialty Chemicals as Irganox 1076. |
| KI | Potassium iodide obtained from Ajay North America |
| CuI | Cuprous iodide |
| PA6 | Nylon-6 having a weight average molecular weight of about 95,000-105,000, obtained from Custom Resins |
| PA66 | Nylon-6,6 having a weight average molecular weight of about 68,000-75,000, obtained from Solutia as Vydyne 21Z |
| Glass Fiber | Glass fiber having a diameter of about 11-13 micrometers and an initial length of about 0.4 centimeters, and |

TABLE 1-continued

| Component | Description, Product Name, Supplier |
|---|---|
| | having an aminosilane surface treatment, obtained from PPG Industries as Chopvantage 3540 |
| 1230 | A flame retardant consisting of aluminum tris(diethyl phosphinate), available commercially from Clariant Corporation as EXOLIT OP 1230 |
| PA6/FR-MB | A flame retardant masterbatch consisting of 40 weight percent EXOLIT OP 1230 and 60 weight percent PA6 |
| Boron Phosphate | Boron phosphate obtained from Budenheim |
| Silicone Fluid | A polydimethylsiloxane obtained from Momentive Performance Materials as SF1706 |
| Zinc Borate | Zinc borate obtained from Chemtura as ZB467 |

Compositions and properties are presented in Table 2, where component amounts are expressed in parts by weight. The extruder used was a 30-millimeter internal diameter Werner-Pfleiderer twin-screw extruder. The extruder had ten barrel segments, each of which was heated to 290° C. Poly (arylene ether), citric acid, cuprous iodide, SEBS, Irganox 0176, potassium iodide, and metal dialkyl phosphinate were dry blended and added in the feedthroat of the extruder. Metal dialkyl phosphinate can also be added as Master batch with polyamide, downstream with polyamide, or downstream alone. The polyamides were added downstream along with the glass fibers. The polyamides can be split fed such that some of the polyamide can be added in the feedthroat (along with the poly(arylene ether) dry blend) and some can be added downstream along concurrently with the glass (separate feeders are used). The rotation rate of the extruder screw was 300 rotations per minute (rpm) and the federate was 40 pounds per hour (18.1 kilograms/hour).

Flammability tests were performed following the procedure of Underwriter's Laboratory Bulletin 94 entitled "Tests for Flammability of Plastic Materials, UL 94", specifically the Vertical Burning Test. Several ratings can be applied based on the rate of burning, time to extinguish, ability to resist dripping, and whether or not the drips are burning. According to this procedure, materials can be classified as UL 94 V-0, V-1, or V-2 on the basis of the test results obtained for five samples of each composition. The criteria for each of these flammability classifications are described below.

V0: In a sample placed so that its long axis is parallel to the flame, the average period of flaming and/or smoldering after removing the igniting flame should not exceed ten seconds and none of the vertically placed samples should produce drips of burning particles that ignite absorbent cotton. For five bars, the total burn time, including all first burns and all second burns should not exceed 50 seconds.

V1: In a sample placed so that its long axis is parallel to the flame, the average period of flaming and/or smoldering after removing the igniting flame should not exceed thirty seconds and none of the vertically placed samples should produce drips of burning particles that ignite absorbent cotton. For five bars, the total burn time, including all first burns and all second burns should not exceed 250 seconds.

V2: In a sample placed so that its long axis is parallel to the flame, the average period of flaming and/or smoldering after removing the igniting flame should not exceed thirty seconds and the vertically placed samples produce drips of burning particles that ignite cotton. For five bars, the total burn time, including all first burns and all second burns should not exceed 250 seconds.

Probabilities of obtaining a particular UL 94 rating were calculated according to the method described in U.S. Pat. No. 6,308,142 to Choate et al. In Table 2, the probability of a first-time pass is abbreviated "pFTP". For example, "pFTP for V-0 @ 3 mm" refers to the probability of a composition achieving a UL 94 value of V-0 when tested for the first time at a thickness of 3 millimeters.

Notched Izod impact strength (NII) values, expressed in joules/meter (J/m) were measured at 23° C. using ⅛-inch (3.188 millimeters) thick bars in accordance with ASTM D256-06, Method A. Tensile elongation at break values, expressed as a percentage, were measured at 23° C. in accordance to ASTM D638-03.

The results in Table 2 show that among the glass filled compositions, only Examples 1, 2, and 3 with a flame retardant consisting solely of a metal diallcyl phosphinate were able to provide a V-0 flammability rating at a thickness of 2 millimeters. In addition, Examples 1-3 exhibited better (greater) notched Izod impact strength values and tensile elongation values than the corresponding comparative examples with alternative flame retardants (Comparative Examples 2-5). These results demonstrate the combination of 5 to 15 weight percent glass fiber and a flame retardant consisting solely of a metal dialkyl phosphinate unexpectedly provides not only improved flame retardancy but also improved physical properties relative to corresponding compositions comprising multi-component flame retardants. This achievement appears to be specific to glass fiber levels in the range of 5 to 15 weight percent.

TABLE 2

| | C. Ex. 1 | C. Ex. 2 | Ex. 1 | Ex. 2 | C. Ex. 3 | C. Ex. 4 | C. Ex. 5 | Ex. 3 | C. Ex. 6 | C. Ex. 7 |
|---|---|---|---|---|---|---|---|---|---|---|
| COMPOSITIONS | | | | | | | | | | |
| PPE | 34 | 31 | 30 | 30 | 34 | 30 | 30 | 32.7 | 38 | 39 |
| Citric Acid | 0.8 | 0.8 | 0.8 | 0.8 | 0.8 | 0.8 | 0.8 | 0.8 | 0.8 | 0.8 |
| SEBS | 0 | 0 | 0 | 3 | 0 | 0 | 0 | 0 | 0 | 0 |
| Irganox 1076 | 0.3 | 0.3 | 0.3 | 0.3 | 0.3 | 0.3 | 0.3 | 0.3 | 0.3 | 0.3 |
| KI | 0.15 | 0.15 | 0.15 | 0.15 | 0.15 | 0.15 | 0.15 | 0.15 | 0.15 | 0.15 |
| CuI | 0.05 | 0.05 | 0.05 | 0.05 | 0.05 | 0.05 | 0.05 | 0.05 | 0.05 | 0.05 |
| PA6 | 0 | 0 | 10 | 10 | 0 | 10 | 10 | 26 | 10 | 10 |
| PA66 | 54.7 | 52 | 41 | 38 | 56.8 | 41 | 41 | 0 | 40 | 51.8 |
| Glass Fiber | 10 | 10 | 10 | 10 | 10 | 10 | 10 | 10 | 0 | 0 |
| 1230 | 0 | 0 | 8 | 8 | 7 | 5 | 0 | 0 | 8 | 7 |
| PA6/FR-MB | 0 | 0 | 0 | 0 | 0 | 0 | 0 | 30 | 0 | 0 |
| Boron Phosphate | 0 | 3.43 | 0 | 0 | 0 | 0 | 0 | 0 | 0 | 0 |

TABLE 2-continued

|  | C. Ex. 1 | C. Ex. 2 | Ex. 1 | Ex. 2 | C. Ex. 3 | C. Ex. 4 | C. Ex. 5 | Ex. 3 | C. Ex. 6 | C. Ex. 7 |
|---|---|---|---|---|---|---|---|---|---|---|
| Silicone Fluid | 0 | 2.2 | 0 | 0 | 0 | 0 | 0 | 0 | 0 | 0 |
| Zinc Borate | 0 | 0 | 0 | 0 | 1 | 5 | 8 | 0 | 0 | 1 |
| PROPERTIES | | | | | | | | | | |
| NII (J/m) | 55 | 39 | 59 | 60 | 39 | 26 | 43 | 58 | — | — |
| Elongation at Break (%) | 9.2 | 5.9 | 6.0 | 8.1 | 2.8 | 3.3 | 3.4 | 5.0 | 38 | 23 |
| pFTP for V-0 @ 3 mm | 0 | 0.99 | 0.98 | 0.99 | 0.04 | 0 | 0 | — | 0 | 1 |
| UL 94 @ 3 mm | NA* | V-0 | V-0 | V-0 | V-1 | NA | NA | — | NA | V-0 |
| No. of Bars Passed/ No. of Bars tested | — | 10/10 | 10/10 | 10/10 | 1/5 | — | — | — | — | 10/10 |
| pFTP for V-0 @ 2 mm | 0 | 0 | 0.99 | 0.99 | 0 | 0 | 0 | 0.99 | 0 | 0.99 |
| UL 94 @ 2 mm | NA | NA | V-0 | V-0 | NA | NA | NA | V-0 | NA | V-0 |
| No. of Bars Passed/ No. of Bars tested | — | — | 10/10 | 10/10 | 0/5 | — | — | 20/20 | — | 10/10 |
| pFTP for V-0 @ 1.6 mm | 0 | 0 | 0.99 | 0.1 | 0 | 0 | 0 | 0.9 | 0 | — |
| UL 94 @ 1.6 mm | NA | NA | V-0 | V-1 | NA | NA | NA | V-0 | NA | — |
| No. of Bars Passed/ No. of Bars tested | — | — | 10/10 | 8/10 | 0/5 | — | — | 20/20 | — | — |

*NA is an individual flame out time greater than 30 seconds

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimer is:

1. A composition comprising:
   a poly(arylene ether);
   a polyamide;
   about 5 to about 15 weight percent glass fiber; and
   a flame retardant consisting of a metal dialkyl phosphinate;
   wherein the composition excludes any polymer other than the poly(arylene ether) and the polyamide;
   wherein the composition excludes electrically conductive fillers;
   wherein all weight percents are based on the total weight of the composition; and
   wherein the composition has a flammability rating of V-0 or V-1 measured according to the UL 94 Vertical Burning Test at a thickness of 3 millimeters, and
   a notched Izod impact strength of at least 40 Joules/meter measured at 23° C. according to ASTM D256, Method A.

2. The composition of claim 1, wherein the composition has a flammability rating of V-0 measured according to the UL 94 Vertical Burning Test at a thickness of 3 millimeters.

3. The composition of claim 1, wherein the composition has a flammability rating of V-0 measured according to the UL 94 Vertical Burning Test at a thickness of 2 millimeters.

4. The composition of claim 1, wherein the composition has a notched Izod impact strength of 50 to 65 Joules/meter measured at 23° C. according to ASTM D256, Method A.

5. The composition of claim 1, wherein the composition has a tensile elongation at break of at least 3 percent, measured at 23° C. according to ASTM D638.

6. The composition of claim 1, wherein the composition has a tensile elongation at break of 3 to 10 percent, measured at 23° C. according to ASTM D638.

7. The composition of claim 1, wherein the poly(arylene ether) comprises repeating structural units having the formula

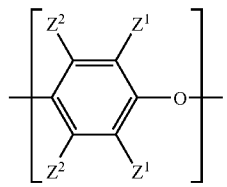

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

8. The composition of claim 1, wherein the poly(arylene ether) comprises 2,6-dimethyl-1,4-phenylene ether units or a combination of 2,6-dimethyl-1,4-phenylene ether units and 2,3,6-trimethyl-1,4-phenylene ether units.

9. The composition of claim 1, wherein the poly(arylene ether) has a glass transition temperature of 160 to 250° C.

10. The composition of claim 1, wherein the polyamide is selected from the group consisting of nylon-6, nylon-6,6, nylon-4, nylon-4,6, nylon-12, nylon-6,10, nylon 6,9, nylon-6,12, amorphous polyamide resins, nylon 6/6T, nylon 6,6/6T, nylon 9T, and combinations of two or more of the foregoing polyamides.

11. The composition of claim 1, wherein the polyamide comprises nylon-6 and nylon-6,6.

12. The composition of claim 1, wherein the poly(arylene ether) and polyamide are compatibilized.

13. The composition of claim 1, wherein the metal dialkyl phosphinate has the formula

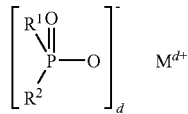

wherein $R^1$ and $R_2$ are independently $C_{1-C6}$ alkyl, phenyl, or aryl; M is calcium, magnesium, aluminum, or zinc; and d is 2 or 3.

14. The composition of claim 13, wherein $R^1$ and $R^2$ are ethyl, M is aluminum, and d is 3.

15. The composition of claim 1, comprising about 25 to about 40 weight percent of the poly(arylene ether), about 40 to about 50 weight percent of the polyamide, about 9 to about 15 weight percent of the flame retardant, and about 8 to about 12 weight percent of the glass fibers.

16. A composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 3 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

17. The composition of claim 16, wherein the composition exhibits
  a notched Izod impact strength of 50 to 65 Joules/meter measured at 23° C. according to ASTM D256, Method A, and
  a tensile elongation at break of 3 to 10 percent, measured at 23° C. according to ASTM D638.

18. A composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 2 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

19. The composition of claim 18, wherein the composition exhibits
  a notched Izod impact strength of 50 to 65 Joules/meter measured at 23° C. according to ASTM D256, Method A, and
  a tensile elongation at break of 3 to 10 percent, measured at 23° C. according to ASTM D638.

20. A composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 1.6 millimeters,
    a notched Izod impact strength of at least 50 Joules/meter measured at 23° C. according to ASTM D256, Method A, and a tensile elongation at break of at least 3 percent, measured at 23° C. according to ASTM D638.

21. The composition of claim 20, wherein the composition exhibits
a notched Izod impact strength of 50 to 65 Joules/meter measured at 23° C. according to ASTM D256, Method A, and
a tensile elongation at break of 3 to 10 percent, measured at 23° C. according to ASTM D638.

22. A composition consisting of:
about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
about 40 to about 50 weight percent of a polyamide comprising nylon-6 and nylon-6,6;
about 0.5 to about 2 weight percent citric acid;
about 8 to about 12 weight percent glass fiber, wherein the glass fiber is not electrically conductive; and
about 9 to about 15 weight percent of a flame retardant consisting of aluminum tris(diethyl phosphinate); and
optionally, up to 5 weight percent of an additive selected from the group consisting of stabilizers, mold release agents, processing aids, drip retardants, nucleating agents, dyes, pigments, antioxidants, anti-static agents, blowing agents, metal deactivators, antiblocking agents, fragrances, and combinations thereof;
wherein the composition is free of impact modifier;
wherein all weight percents are based on the total weight of the composition; and
wherein the composition exhibits
a flammability rating of V-0 measured according to the UL 94 Vertical Burning Test at a thickness of 2 millimeters,
a notched Izod impact strength of at least 50 Joules/meter measured at 23° C. according to ASTM D256, Method A, and
a tensile elongation at break of at least 3 percent, measured at 23° C. according to ASTM D638.

23. The composition of claim 22, wherein the composition exhibits
a notched Izod impact strength of 50 to 65 Joules/meter measured at 23° C. according to ASTM D256, Method A, and
a tensile elongation at break of 3 to 10 percent, measured at 23° C. according to ASTM D638.

24. A method of preparing a thermoplastic composition, comprising:
melt kneading
a poly(arylene ether),
a polyamide,
about 5 to about 15 weight percent glass fiber, and
a flame retardant consisting of a metal dialkyl phosphinate to form a thermoplastic composition;
wherein all weight percents are based on the total weight of the composition;
wherein the thermoplastic composition excludes any polymer other than the poly(arylene ether) and the polyamide;
wherein the composition excludes electrically conductive fillers; and
wherein the composition has
a flammability rating of V-0 or V-1 measured according to the UL 94 Vertical Burning Test at a thickness of 3 millimeters, and
a notched Izod impact strength of at least 40 Joules/meter measured at 23° C. according to ASTM D256, Method A.

25. The method of claim 24, wherein the flame retardant and a portion of the polyamide are provided in the form of a masterbatch comprising about 30 to about 50 weight percent flame retardant and about 50 to about 70 weight percent polyamide, based on the weight of the masterbatch.

26. A thermoplastic composition prepared by the method of claim 24.

27. A method of preparing a thermoplastic composition, comprising:
melt kneading
about 25 to about 40 weight percent of a poly(arylene ether) comprising 2,6-dimethyl-1,4-phenylene ether units or a combination of 2,6-dimethyl- 1,4-phenylene ether units and 2,3,6-trimethyl-1,4-phenylene ether units,
about 40 to about 50 weight percent of a polyamide comprising nylon-6 and nylon-6,6,
about 0.5 to about 2 weight percent citric acid,
about 8 to about 12 weight percent glass fiber, and
about 9 to about 15 weight percent of a flame retardant consisting of
aluminum tris(diethyl phosphinate) to form a thermoplastic composition;
wherein the thermoplastic composition excludes any polymer other than the poly(arylene ether) and the polyamide;
wherein the composition excludes electrically conductive fillers;
wherein all weight percents are based on the total weight of the thermoplastic composition; and
wherein the thermoplastic composition exhibits
a flammability rating of V-0 measured according to the UL 94 Vertical Burning Test at a thickness of 2 millimeters,
a notched Izod impact strength of at least 50 Joules/meter measured at 23° C. according to ASTM D256, Method A, and
a tensile elongation at break of at least 3 percent, measured at 23° C. according to ASTM D638.

28. The method of claim 27, wherein the composition exhibits
a notched Izod impact strength of 50 to 65 Joules/meter measured at 23° C. according to ASTM D256, Method A, and
a tensile elongation at break of 3 to 10 percent, measured at 23° C. according to ASTM D638.

29. The method of claim 27, wherein the flame retardant and a portion of the polyamide are provided in the form of a masterbatch comprising about 30 to about 50 weight percent flame retardant and about 50 to about 70 weight percent polyamide, based on the weight of the masterbatch.

30. A thermoplastic composition prepared by the method of claim 27.

31. An article comprising a composition comprising:
a poly(arylene ether);
a polyamide;
about 5 to about 15 weight percent glass fiber; and
a flame retardant consisting of a metal dialkyl phosphinate;
wherein the composition excludes any polymer other than the poly(arylene ether) and the polyamide;
wherein the composition excludes electrically conductive fillers;
wherein all weight percents are based on the total weight of the composition; and wherein the composition has
  a flammability rating of V-0 or V-1 measured according to the UL 94 Vertical Burning Test at a thickness of 3 millimeters, and
  a notched Izod impact strength of at least 40 Joules/meter measured at 23° C. according to ASTM D256, Method A.

32. An article comprising a composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 3 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

33. An article comprising a composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 2 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

34. An article comprising a composition comprising:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber; and
  about 9 to about 15 weight percent of a flame retardant consisting of aluminum tris(diethyl phosphinate);
  wherein the composition excludes any polymer other than the poly(arylene ether) and the polyamide;
  wherein the composition excludes electrically conductive fillers;
  wherein all weight percents are based on the total weight of the composition; and
  wherein the composition exhibits
    a flammability rating of V-0 measured according to the UL 94 Vertical Burning Test at a thickness of 1.6 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

35. An article comprising a composition consisting of:
  about 25 to about 40 weight percent of a poly(arylene ether) comprising 2,6-dimethyl-1,4-phenylene ether units or a combination of 2,6-dimethyl-1,4-phenylene ether units and 2,3,6-trimethyl-1,4-phenylene ether units;
  about 40 to about 50 weight percent of a polyamide comprising nylon-6 and nylon-6,6;
  about 0.5 to about 2 weight percent citric acid;
  about 8 to about 12 weight percent glass fiber, wherein the glass fiber is not electrically conductive; and
  about 9 to about 15 weight percent of a flame retardant consisting of aluminum tris(diethyl phosphinate); and
  optionally, up to 5 weight percent of an additive selected from the group consisting of stabilizers, mold release agents, processing aids, drip retardants, nucleating agents, dyes, pigments, antioxidants, anti-static agents, blowing agents, metal deactivators, antiblocking agents, fragrances, and combinations thereof;
  wherein the composition is free of impact modifier;
  wherein all weight percents are based on the total weight of the composition; and
  wherein the composition exhibits
    a flammability rating of V-0 measured according to the UL 94 Vertical Burning Test at a thickness of 2 millimeters,
    a notched Izod impact strength of at least 50 Joules/meter measured at 23° C. according to ASTM D256, Method A, and
    a tensile elongation at break of at least 3 percent, measured at 23° C. according to ASTM D638.

36. An article comprising the composition of claim 26.
37. An article comprising the composition of claim 30.

* * * * *